United States Patent
Kroyzer et al.

(10) Patent No.: US 11,817,816 B2
(45) Date of Patent: Nov. 14, 2023

(54) SOLAR ENERGY SYSTEM AND GEARED DRIVE SYSTEM

(71) Applicant: Solargik Ltd, Jerusalem (IL)

(72) Inventors: Gil Kroyzer, Jerusalem (IL); Israel Kroizer, Jerusalem (IL)

(73) Assignee: Solargik Ltd, Jerusalem (IL)

(*) Notice: Subject to any disclaimer, the term of this patent is extended or adjusted under 35 U.S.C. 154(b) by 0 days.

(21) Appl. No.: 17/845,196

(22) Filed: Jun. 21, 2022

(65) Prior Publication Data

US 2023/0044525 A1 Feb. 9, 2023

Related U.S. Application Data

(60) Provisional application No. 63/260,068, filed on Aug. 9, 2021.

(51) Int. Cl.
*H02S 20/32* (2014.01)
*H02S 40/32* (2014.01)
(Continued)

(52) U.S. Cl.
CPC ............. *H02S 20/32* (2014.12); *F16H 19/08* (2013.01); *G05B 19/042* (2013.01); *H02J 3/004* (2020.01);
(Continued)

(58) Field of Classification Search
CPC .......... H02S 23/32; H02S 40/02; H02J 3/004; H02J 3/381; H02J 3/46; G05B 19/042;
(Continued)

(56) References Cited

U.S. PATENT DOCUMENTS

| 7,926,480 B2 | 4/2011 | Le Lievre |
| 2010/0258110 A1 | 10/2010 | Krabbe |

(Continued)

FOREIGN PATENT DOCUMENTS

| CN | 104682435 A | 6/2015 |
| CN | 108110791 A | 6/2018 |

(Continued)

OTHER PUBLICATIONS

Co-pending U.S. Appl. No. 17/718,351 filed Apr. 12, 2022.
(Continued)

*Primary Examiner* — Colby M Hansen
(74) *Attorney, Agent, or Firm* — Momentum IP; Marc Van Dyke

(57) ABSTRACT

A solar energy system includes a photovoltaic (PV) assembly and a drive system. The PV assembly comprises a support subassembly and an array of PV panels pivotable therewith about a longitudinal axis of the PV assembly. The drive system comprises a motor assembly comprising an electric motor and a gearing arrangement, and a pivot wheel comprising a hoop-portion and joined to the PV assembly. The hoop portion includes an outer circumferential channel, and two opposing catches defining a maximum pivot range. A chain resides partly within the circumferential channel, is engaged with the two opposing catches, and is also in geared communication with the motor assembly such that the motor is operable to rotate the pivot wheel. In some embodiments, the opposing catches define a maximum pivot range through an arc of more than $\pi$ radians and less than $2\pi$ radians.

20 Claims, 9 Drawing Sheets

(51) Int. Cl.
*H02J 3/00* (2006.01)
*H02J 3/38* (2006.01)
*H02J 3/46* (2006.01)
*F16H 19/08* (2006.01)
*G05B 19/042* (2006.01)

(52) U.S. Cl.
CPC ............... *H02J 3/381* (2013.01); *H02J 3/46* (2013.01); *H02S 40/32* (2014.12); *F16H 2019/085* (2013.01); *G05B 2219/2639* (2013.01)

(58) Field of Classification Search
CPC ............. G05B 2219/2639; F16H 19/08; F16H 2019/085
USPC ........................................................ 475/167
See application file for complete search history.

(56) References Cited

U.S. PATENT DOCUMENTS

| | | |
|---|---|---|
| 2014/0360555 A1 | 12/2014 | Kim |
| 2016/0233679 A1 | 8/2016 | Li |
| 2018/0097126 A1 | 4/2018 | Gonatas |
| 2018/0254740 A1* | 9/2018 | Corio .................... F24S 30/452 |
| 2019/0296688 A1* | 9/2019 | Kresse .................... H02S 20/10 |
| 2023/0039146 A1 | 2/2023 | Kroyzer |
| 2023/0044525 A1 | 2/2023 | Kroyzer |

FOREIGN PATENT DOCUMENTS

| | | |
|---|---|---|
| CN | 109787260 A | 5/2019 |
| WO | 2013/028661 A1 | 2/2013 |
| WO | 2017/112573 A1 | 6/2017 |
| WO | 2019/084454 A1 | 5/2019 |

OTHER PUBLICATIONS

Co-pending U.S. Appl. No. 17/883,666, filed Aug. 9, 2022.
International Search Report for PCT/IB2022/061301 document completed Apr. 30, 2023.
International Search Report for PCT/IB2022/061302 document completed Apr. 25, 2023.
International Search Report for PCT/IB2022/061303 document completed Apr. 23, 2023.
Machine translation of CN104682435 (original document published in Chinese on Jun. 3, 2015).
Machine translation of CN108110791 (original document published in Chinese on Jun. 1, 2019).
Machine translation of CN109787260 (original document published in Chinese on May 21, 2019).
Sasmal RP, Sen S, Chakraborty A. Solar photovoltaic output smoothing: Using battery energy storage system. In2016 National Power Systems Conference (NPSC) Dec. 19, 2016 (pp. 1-5). IEEE.
Unpublished PCT/IB2022/061301 filed on Nov. 22, 2022.
Unpublished PCT/IB2022/061302 filed on Nov. 22, 2022.
Unpublished PCT/IB2022/061303 filed on Nov. 22, 2022.
Written Opinion for PCT/IB2022/061301 document completed Apr. 30, 2023.
Written Opinion for PCT/IB2022/061302 document completed Apr. 25, 2023.
Written Opinion for PCT/IB2022/061303 document completed Apr. 23, 2023.

* cited by examiner

DETAIL "A"
FROM FIG. 1A

DETAIL "B"
FROM FIG. 1B

DETAIL "C"
FROM FIG. 2A

Step S01 provide a pivot wheel 50 comprising a hoop-portion 65 and joined to the PV assembly 57, the hoop portion 65 including an outer circumferential channel 67 and two opposing catches 68 circumferentially displaced from each other, and a drive system comprising a motor assembly 40 comprising an electric motor 42 and a gearing arrangement 30, and a chain 70 residing partly within the circumferential channel 67 and engaged with the two opposing catches 68, the chain 70 in geared communication with the motor assembly 40

Step S02 provide electricity to rotate the motor 42, wherein the rotating of the motor 42 is effective to rotate the pivot wheel 50

FIG. 7A

Step S03 adjust a position of a guide wheel 33 to regulate a tension in the chain 70

FIG. 7B

SOLAR ENERGY SYSTEM AND GEARED DRIVE SYSTEM

CROSS-REFERENCE TO RELATED APPLICATIONS

This patent application claims the benefit of U.S. Provisional Patent Application No. 63/260,068 filed on Aug. 9, 2021, which is incorporated herein by reference in its entirety.

FIELD OF THE INVENTION

The present invention relates to solar energy systems and in particular to devices and methods for efficient tracking of the sun by photovoltaic (PV) assemblies.

BACKGROUND

Achieving a diversified low-carbon emissions energy economy has been limited by economic and technological limitations. Solar energy systems comprising photovoltaic (PV) arrays are commonly deployed to capture energy from both direct and diffuse (including reflected) solar irradiance. Tracking PV systems are deployed in which PV arrays are pivoted to reduce the cosine losses of the direct irradiance component, so-called because the energy absorbed is a function of the cosine of the angle between the incidence vector and a normal vector of the PV array. Commercial tracking systems are limited to a pivot range substantially less than $\pi$ radians, and deploy drive systems with low gear ratios, which can require higher torque from the drive motor.

Electricity has been generated for many years using PV (photovoltaic) cells, by converting photons directly to electrons, as known in the art. In the specification and claim which follows, the acronym PV is intended to mean both PV cells and likewise PV cell arrays, as known in the art. Additionally, the term "collector" is intended to mean a PV array serving to absorb incident sunlight and the term "absorber" is used interchangeably with "collector" hereinbelow. The terms "inclination" and "tilt" are used interchangeably hereinbelow.

PV arrays serve to generate electricity when solar illumination is incident upon the arrays. Generated electricity is typically fed into an electrical grid of the city/locality—as known in the art.

Sunlight collected by PV arrays is categorized into two types:
1. Direct Normal Radiation (DNR), sometimes referred to as Direct Normal irradiation (DNI), and
2. Diffused Irradiation, which when measured on a flat surface is equivalent to Diffused Horizontal Irradiation (DHI) and, when the PV array is inclined, is called Diffused Tilted Irradiation (DTI).

One way to significantly increase electrical generation obtained from PV arrays is to have the PV arrays maintained as close as possible to normal (i.e., to obtain DNI). This can be done by mounting the arrays on a solar tracker mechanism (hereinbelow called "tracker" or "PV tracker") to effectively track the sun during the day. However, a shortcoming of PV trackers is increasing mechanical complexity (and concomitant electrical consumption)—not to mention increased overall device cost—as tracking is performed in 2 or more axes.

There is therefore a need for a PV tracker having minimal mechanical complexity and concomitant lower electrical consumption, while providing reliable and near-optimal solar tracking to enhance electrical generation obtained from PV arrays.

SUMMARY

According to embodiments of the present invention, a photovoltaic (PV) energy system comprises: (a) a PV assembly comprising a support subassembly and an array of PV panels joined thereto and pivotable therewith about a longitudinal axis of the PV assembly; and (b) a drive system comprising: (i) a motor assembly comprising an electric motor and a gearing arrangement, (ii) a pivot wheel comprising a hoop-portion and joined to the PV assembly, the hoop portion including an outer circumferential channel and two opposing catches circumferentially displaced from each other to define a maximum pivot range of the PV assembly, which can be through an arc subtending an angle of at least $\pi$ radians and less than $2\pi$ radians, and (iii) a chain residing partly within the circumferential channel and engaged with the two opposing catches, the chain in geared communication with the motor assembly such that the motor is operable to rotate the pivot wheel.

In some embodiments, the motor assembly can include a drive wheel in geared communication with the motor and engaged with the chain.

In some embodiments, the drive system can comprise a guide wheel position-adjustably engaged with the chain to regulate a tension therein.

In some embodiments, the drive system can comprise first and second guide wheels engaged with the chain such that the chain leaves the circumferential channel, partly circumscribes the first guide wheel, partly circumscribes the drive wheel, partly circumscribes the second guide wheel, and returns to the circumferential channel.

In some embodiments, the motor can be operable to rotate the pivot wheel with a final gear ratio of at least 10,000:1. In some embodiments, the final gear ratio can be at least 12,000:1.

In some embodiments, the opposing catches can be disposed to limit the maximum pivot range of the PV assembly to an arc described by the circumferential channel.

A drive system for a photovoltaic (PV) system is disclosed, according to embodiments of the present invention. The PV system includes a PV assembly comprising a support subassembly and an array of PV panels joined thereto and pivotable therewith about a longitudinal axis of the PV assembly. The drive system comprises: (a) a motor assembly comprising an electric motor and a gearing arrangement; (b) a pivot wheel comprising a hoop-portion and joined to the PV assembly, the hoop portion including an outer circumferential channel and two opposing catches circumferentially displaced from each other to define a maximum pivot range of the PV assembly which can be through an arc subtending an angle of at least $\pi$ radians and less than $2\pi$ radians; and (c) a chain residing partly within the circumferential channel and engaged with the two opposing catches, the chain in geared communication with the motor assembly such that the motor is operable to rotate the pivot wheel.

In some embodiments, the motor assembly can include a drive wheel in geared communication with the motor and engaged with the chain.

In some embodiments, the drive system can additionally comprise a guide wheel position-adjustably engaged with the chain to regulate a tension therein.

In some embodiments, the motor can be operable to rotate the pivot wheel with a final gear ratio of at least 10,000:1. In some embodiments, the final gear ratio can be at least 12,000:1.

A method is disclosed, according to embodiments of the present invention, for rotating a PV assembly. The PV assembly comprises a support subassembly and an array of PV panels joined thereto and pivotable therewith about a longitudinal axis of the PV assembly. The method comprises: (a) providing (i) a pivot wheel comprising a hoop-portion and joined to the PV assembly, the hoop portion including an outer circumferential channel and two opposing catches circumferentially displaced from each other, (ii) a drive system comprising a motor assembly comprising an electric motor and a gearing arrangement, and (iii) a chain residing partly within the circumferential channel and engaged with the two opposing catches, the chain in geared communication with the motor assembly; (b) providing electricity to rotate the motor, wherein the rotating of the motor is effective to rotate the pivot wheel.

In some embodiments, providing the drive system can include providing a drive wheel in geared communication with the motor and engaged with the chain.

In some embodiments, providing the drive system can include providing a guide wheel position-adjustably engaged with the chain to regulate a tension therein. In some embodiments, the method additionally comprises: adjusting a position of the guide wheel to regulate a tension in the chain.

In some embodiments, providing the drive system can include providing first and second guide wheels engaged with the chain such that the chain leaves the circumferential channel, partly circumscribes the first guide wheel, partly circumscribes the drive wheel, partly circumscribes the second guide wheel, and returns to the circumferential channel.

In some embodiments, the motor can rotate the pivot wheel with a final gear ratio of at least 10,000:1. In some embodiments, the final gear ratio can be at least 12,000:1.

In some embodiments, the opposing catches can be disposed to substantially limit the maximum pivot range of the PV assembly to an arc described by the circumferential channel. In some embodiments, a maximum pivot range of the PV assembly is through an arc subtending an angle of at least π radians and less than 2π radians

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIGS. 7A and 7B show flowcharts of a method and method steps for rotating a PV assembly, according to embodiments of the present invention.

DETAILED DESCRIPTION OF THE ILLUSTRATED EMBODIMENTS

Figure 1A:
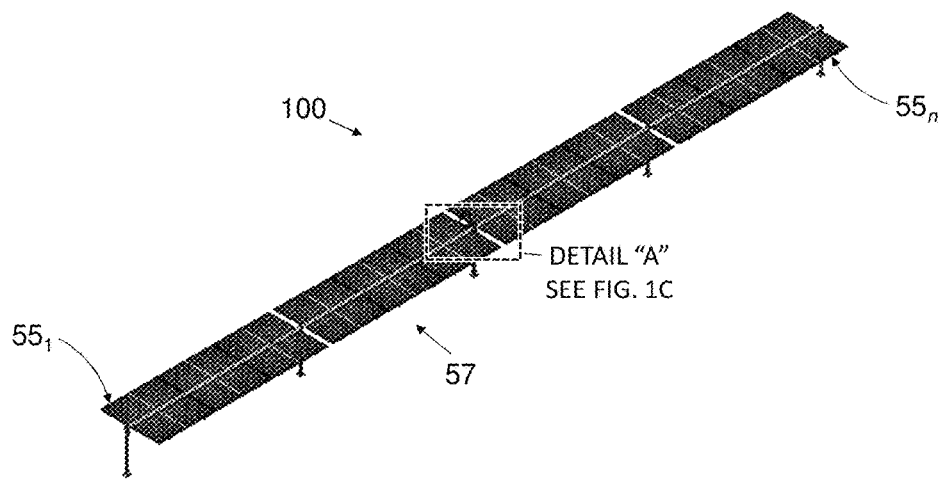
FIG. 1A is a schematic perspective-view illustration of a photovoltaic (PV) energy system according to embodiments of the present invention.
Figure 1B:
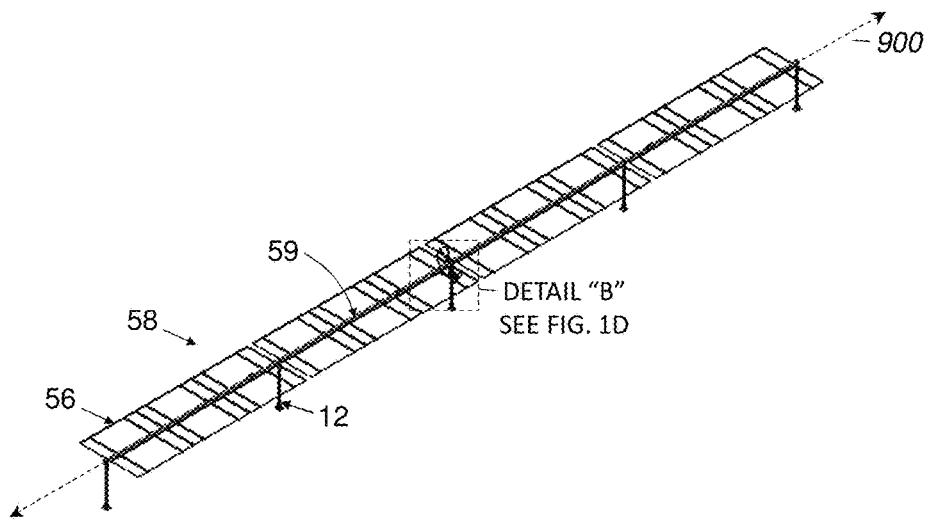
FIG. 1B is a schematic perspective-view illustration of a support subassembly of a PV assembly and a drive system, according to embodiments of the present invention.
Figure 1C:
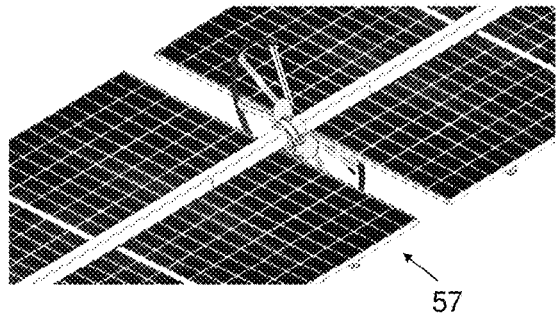
FIG. 1C shows an enlarged detail from FIG. 1A including the drive system.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

A 'solar energy system' as used herein means a system for generating electricity using an array of photovoltaic (PV) modules. The system can include an inverter for converting the direct-current (DC) electricity generated by the PV modules to alternating current (AC) electricity, e.g., for delivery to an electricity grid. Embodiments disclosed herein relate to apparatus and systems for operating a solar energy system incorporating a solar tracker. A solar tracker, or simply 'tracker', is an arrangement that changes the attitude of the PV panels so as to capture, i.e., convert, a higher proportion of the direct irradiance falling on the panels over the course of any given period of time by reducing the angle between direct solar radiation and a vector normal to the PV panels. A single-axis tracker is one that rotates PV panels around a single axis, usually from east to west over the course of a day around a north-south axis. Some single-axis trackers are arranged to rotate about an east west axis.

Referring now to the figures, and in particular to FIGS. 1A, 1B, 1C and 1D, a solar energy system 100 according to embodiments includes a PV assembly 57. The PV assembly 57 includes an array of n PV panels $55_1$ through $55_n$, joined to a support subassembly 58. The support subassembly 58 includes an array of frames 56 for mounting the PV panels 55, and a central elongated member 59 to which the frames 56 are joined. The central elongated member 59 serves to transfer a torque to rotate the frames 56 as a unit together with the central elongated member 59 and the PV panels 55. The PV assembly 57 is rotated about a central longitudinal axis indicated in FIGS. 1B and 1D by arrow 900. The central elongated member 59 is pivotably supported by ground supports 12.

A drive system 110 according to embodiments includes a motor assembly 40 and a pivot wheel 50, and is also supported by a ground support 12. The drive system 110, as shown in FIG. 1A, can be located in the center of the PV assembly 57. In other examples, a drive system can be located elsewhere and/or configured differently than the example illustrated while adhering to one or more (e.g., in combination) of the embodiments disclosed herein, such as an extended pivot range and/or a high final gear ratio. In embodiments, the motor assembly 40 is operable to rotate a pivot wheel 50 which in turn is positioned to rotate the central elongated member 59 and, with it, the entire PV assembly 57.

Figure 1D:
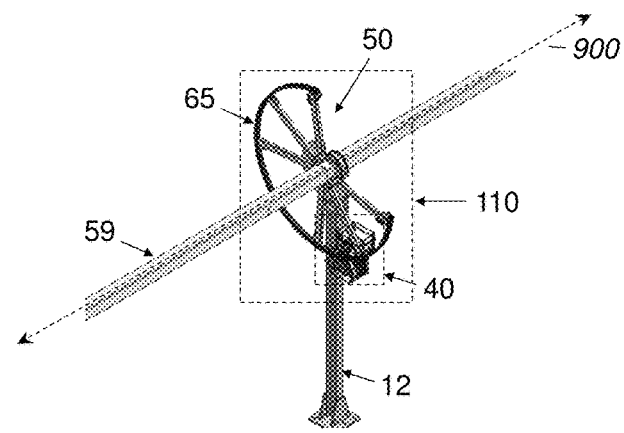
FIG. 1D shows an enlarged detail from FIG. 1B including the drive system.
Figure 2A:
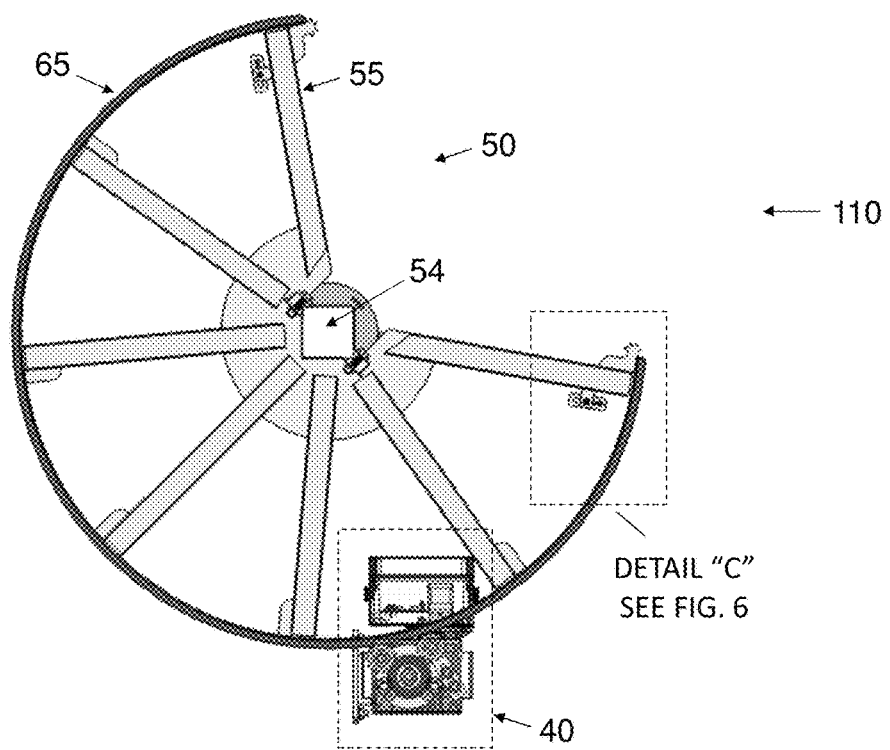
FIG. 2A is a schematic elevation view of a drive system according to embodiments of the present invention.

FIG. 2A shows selected elements of the drive system 110 of FIG. 1D in a greater degree of detail. The pivot wheel 50 includes a hoop-portion 65 which is joined to the PV assembly, e.g., by passing the central elongated member 59 through the volume 54 at the center of the pivot wheel 50. In the non-limiting example of FIG. 2A, the hoop-portion 65 is supported by a plurality of spokes 55. The extent of the arc of the hoop-portion 65 is a factor in determining the extent to which the PV assembly 57 can rotate, as will be described in greater detail hereinbelow.

Rotation range of a PV assembly in tracking-enabled solar energy systems is typically designed to be through an arc of less than π radians, in accordance with the path of the sun across the sky during the solar day. Nonetheless, the inventors have found that it can be beneficial to the operation of a solar energy system, including to the total energy output of the system and the cost per unit of electricity produced, to increase the rotation range beyond an arc of π radians. Inter alia, an extended rotation range, i.e., greater than or equal to π radians, enables the PV assembly to be rotated to a 'non-sun-facing' position that reduces the accumulation of dust and other contaminants on the surface of the PV panels. Examples of tracker positions enabled by an extended rotation range are shown in FIGS. 3A-3E. The exemplary drive systems in FIGS. 3A-3E are shown for purposes of illustration and consistency as having a hoop-portion subtending an arc of 1.5π radians, i.e., having a maximum pivot range 1.5π radians. In other examples, the arc and corresponding maximum pivot range can be elsewhere in the range that is at least π radians and less than 2π radians.

Figure 3A:
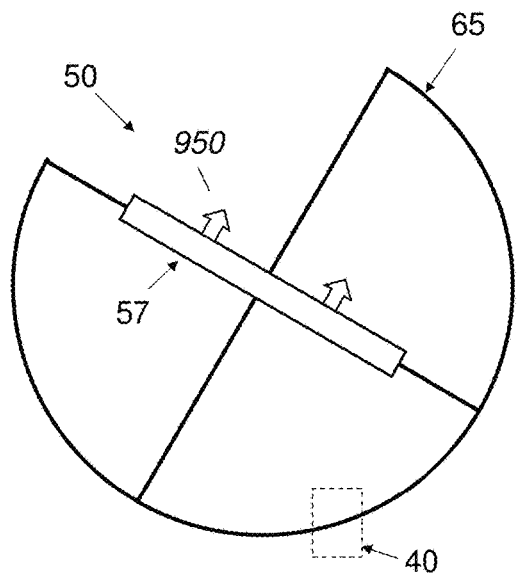
FIGS. 3A, 3B, 3C, 3D and 3E are schematic representations of a pivot wheel of a PV assembly in various orientations, according to embodiments of the present invention.
Figure 3B:
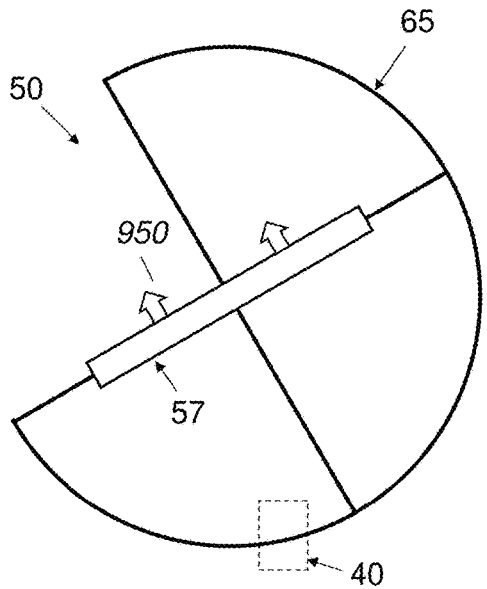
Figure 3C:
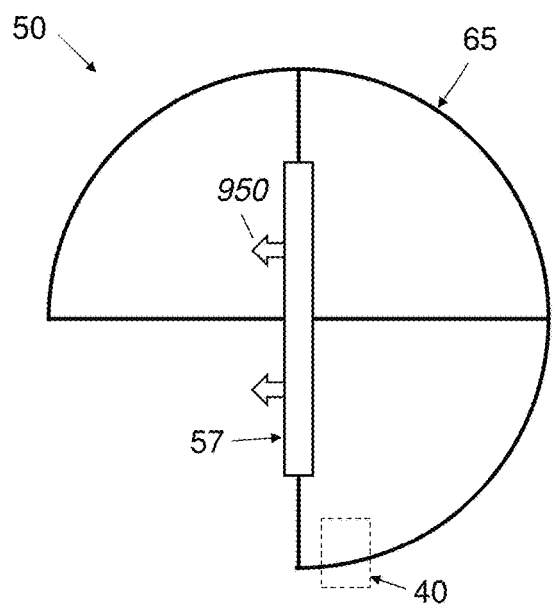
Figure 3D:
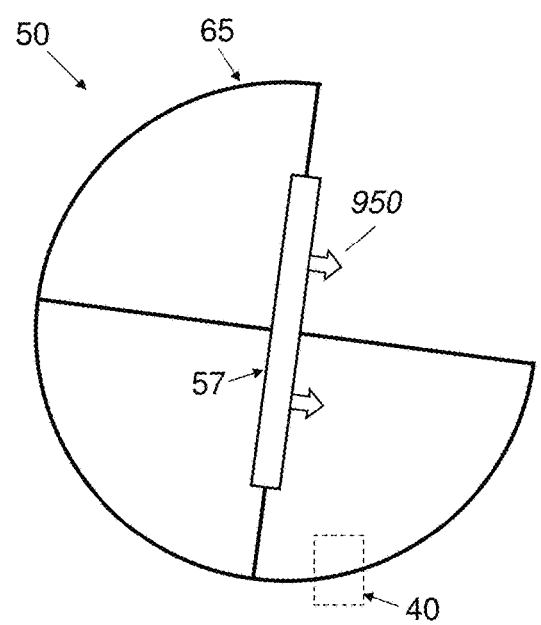
Figure 3E:
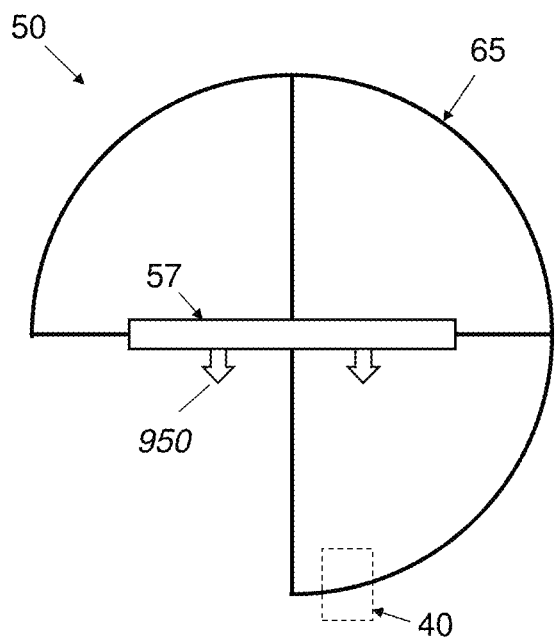

Each of the drive systems in FIGS. 3A-3E includes a motor assembly 40 and a pivot wheel 50 comprising a hoop portion 65. The figures also show a cross-section of a PV assembly 57, with the 'towards-the-sun' direction indicated by arrows 950. FIGS. 3A and 3B are typical on-sun orientations achieved by single-axis tracking PV systems, e.g., in the morning and in the afternoon. FIG. 3C shows an orientation achievable by employing an extended-pivot range according to embodiments. The PV assembly 57 is oriented in a position that is perpendicular to the ground, e.g., for night storage in an orientation that reduces the amount of dirt and other contaminants, e.g., organic contaminants, that reduce the energy output of the solar energy system when accumulated on the sun-facing surface 950 of the PV assembly 57. The night storage position can be closer to the end-of-day (sunset or pre-sunset) orientation, or closer to the morning (sunrise or post-sunrise) orientation, i.e., facing in either direction, according to an operating strategy, e.g., a strategy taking into account rotation speed and availability of stored power for pivot the PV panels in the absence of solar irradiance. FIG. 3D shows another storage position, e.g., night storage position, that actually goes 'beyond' the vertical orientation such that the normally sun-facing surface 950 of the PV assembly 57 is rotated to face slightly downward relative to the position illustrated in FIG. 3C, to further reduce the buildup of dirt and other contaminants on the sun-facing surface 950. Like the orientation of FIG. 3C, this position is achievable by employing an extended-pivot range according to embodiments. FIG. 3E illustrates another example of an orientation employing an extended-pivot range according to embodiments, which the sun-facing surface 950 of the PV assembly 57 is rotated to face the ground. A PV system without an extended pivot range may be programmed to have the sun-facing surface 950 facing upward, (e.g., similar to its orientation at solar noon) for protection from high winds. The position of FIG. 3E reaches a similarly safe stowage position but with a maximum reduction in dirt accumulation on the sun-facing surface 950 by having the sun-facing surface 950 facing downwards.

Figure 4A:
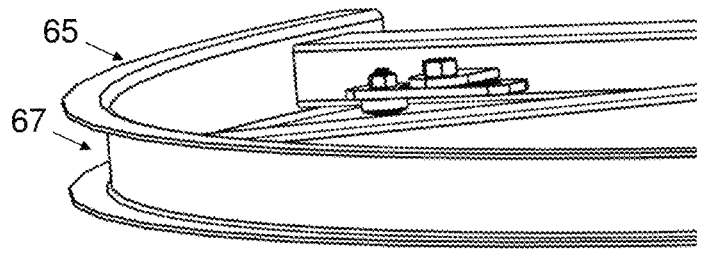
FIG. 4A shows part of a hoop portion of a pivot wheel including an outer circumferential channel, according to embodiments of the present invention.
Figure 4B:
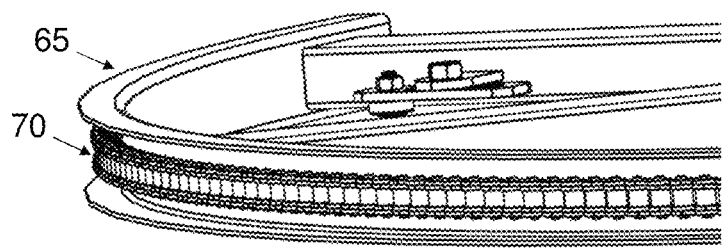
FIG. 4B shows the part of the hoop portion of FIG. 4A with a chain resident in the outer circumferential channel, according to embodiments of the present invention.
Figure 5:
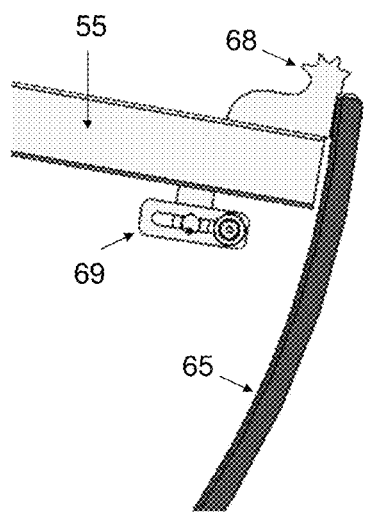
FIG. 5 shows an enlarged detail of FIG. 1A including a chain catch according to embodiments of the present invention.

We now refer to FIGS. 4A and 4B, which reveal that the hoop portion 65, shown for example in FIG. 2A is shaped to include a circumferential channel 67 in which resides, or partly resides, a chain 70. FIG. 5 shows a detail of FIG. 2A, showing the 'catch' 68 provided for attaching an end of the chain 70 that resides in the circumferential channel 67 of the hoop portion 65, e.g., by hooking a chain link in one of the spikes of the catch 68. The skilled artisan will understand that the shape of the catch 68 in the figures is purely illustrative of one non-limiting example, and any shape that provides a hook or other portion to which a chain link can be connected, including detachably connected, can be suitable. In some embodiments, the catch 68 is positioned to place the end of the chain close to the end of the circumferential channel 67. In some embodiments, the catch 68 may require an additional length of the chain 70 beyond the end of the circumferential channel 67, or for the chain 70 to end before the end of the circumferential channel 67, all as a matter of design choice.

Figure 6A:
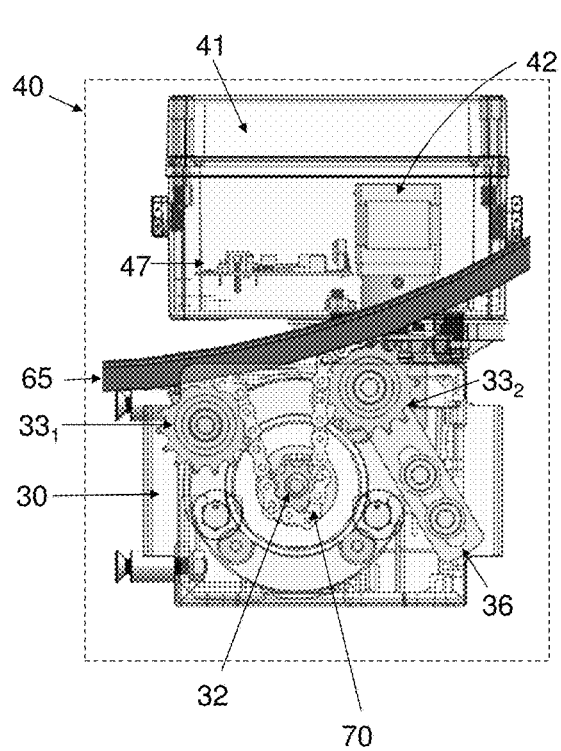
FIGS. 6A and 6B are schematic elevation views of a motor assembly for a PV system, according to embodiments of the present invention.
Figure 6B:
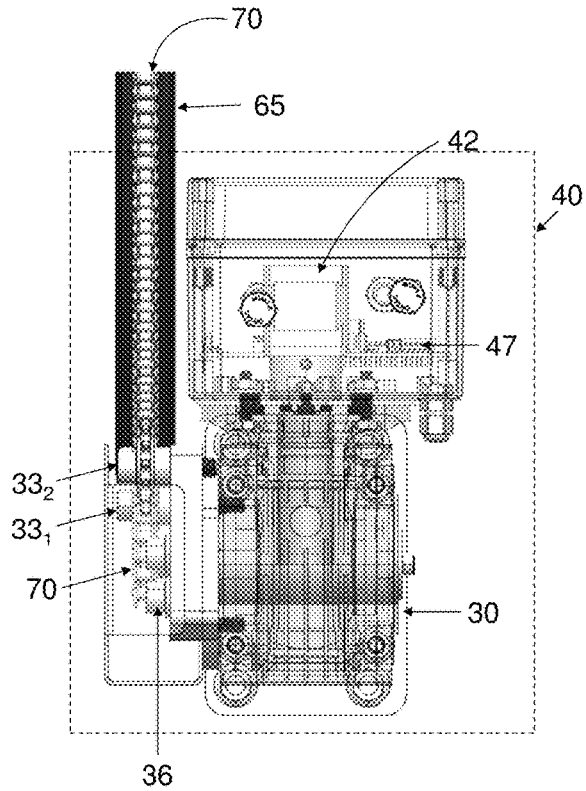

FIGS. 6A and 6B show two schematic views of an exemplary motor unit 40 and its interaction with the chain 70 that resides in the circumferential channel 67 of the hoop portion 65. In the non-limiting example of FIGS. 6A and 6B, a motor 42 is disposed within a motor enclosure 41, inter alia, for environmental protection. Electronic circuitry 47 is also provided for controlling the motor 42. The motor 42, e.g., a rotor of the motor, is engaged with a reduction gear, which is some embodiments includes, a planetary gear having a gear ratio of at least 5:1. The planetary gear is further engaged with a worm drive having a gear ratio of at least 50:1, or at least 60:1. In the non-limiting example of FIGS. 6A and 6B, the worm drive (optionally enclosed in gear enclosure 30) is effective to turn a shaft aligned with a drive wheel arranged for rotating the pivot wheel 50. In FIG. 6A, the drive wheel 32 is aligned with said shaft (not shown) turned by the worm drive, and the drive wheel 32 is engaged with the chain 70. When the chain 70 is attached to the catches 68 at either end of the circumferential channel 67 of the hoop portion 65, a rotational movement of the drive wheel 32 is operative to rotate the hoop portion 65 about its central volume 54 installed on the central elongated member 59 of the support subassembly 58. The diameter of the hoop portion 65, i.e., of the pivot wheel 50, can be at least 30 times larger than the diameter of the shaft turning the drive wheel 32, or at least 40 times larger, or more. Thus the drive wheel can provide a gear ratio of at least 30:1, or at least 40:1, or even higher. By multiplying the gear ratios of the successive gears in the gearing arrangement, e.g., planetary gear plus worm gear, and by the gear ratio of the pivot wheel, the resulting final gear ratio of the drive system can be at least 10,000:1 or at least 12,000:1, according to some embodiments.

It can be desirable to provide a mechanism for regulating tension in the chain 70, e.g., so that the pivoting of the pivot wheel 50 in response to rotation of the drive wheel 32 is precise and without slack. Thus, as shown in FIG. 6A, one or more guide wheels 33 are positioned between the drive wheel 32 and the circumferential channel 67 of the hoop portion 65, where they are partly circumscribed by the chain 70. The path of the chain 70 in FIG. 6A is such that the chain 70 leaves the circumferential channel 67, partly circumscribes the first guide wheel $33_1$, partly circumscribes and engages with the drive wheel 32, partly circumscribes the second guide wheel 332, and returns to the circumferential channel 67. According to embodiments, a tensioning mechanism 36 is provided to move at least one of the one or more guide wheels 33—in FIG. 6A, the tensioning mechanism is operable to regulate tension in the chain 70 by adjusting the position of the guide wheel 332. In other examples (not shown), a second, similar tensioning mechanism can be engaged with the guide wheel $33_1$ on the other side of the drive wheel.

In embodiments, the maximum pivot range of the pivot wheel 50 is defined at either end of the range by the end of the circumferential channel 67 of the hoop portion 65. In some embodiments, the maximum pivot range of the pivot wheel 50 is defined at either end of the range by the extent to which the chain can enter one of the guide wheels 33 before arriving at the end of the chain. In such embodiments, the length of the chain 70 between the end of the circumferential channel 67 and where the chain engages with a respective catch 68 is selected to accommodate the rotation of the pivot wheel 67 to a desired end of the maximum pivot range. In some embodiments, the maximum pivot range of the pivot wheel 50 is pre-defined and programmed or programmable in the controller 47 of the motor, such that, for example, the rotation is stopped by the controller at the end of a desired pivot range and does not apply excess tension to the chain. In some embodiments, the controller tracks the orientation of the pivot wheel 50. In some embodiments, the controller utilizes a feedback mechanism such as a mechanical, electromechanical or optical sensor which registers and/or transmits a pivot wheel position.

Referring now to FIG. 7A, a method is disclosed for rotating a PV assembly, e.g., the PV assembly 57 of FIG. 1A. According to the method, the PV assembly comprises a support subassembly 58 and an array of PV panels 55 joined thereto and pivotable therewith about a longitudinal axis 900 of the PV assembly 57. As illustrated by the flow chart in FIG. 7A, the method comprises at least the 2 method steps S01 and S02:

Step S01 includes: providing:
  a pivot wheel 50 comprising a hoop-portion 65 and joined to the PV assembly 57. The hoop portion 65 includes an outer circumferential channel 67 and two opposing catches 68 circumferentially displaced from each other.
  a drive system 50 comprising a motor assembly 40 that includes an electric motor 42 and a gearing arrangement 30, and
  a chain 70 residing partly within the circumferential channel 67 and engaged with the two opposing catches 68, the chain 70 in geared communication with the motor assembly 40.

In some embodiments, Step S01 includes providing a drive wheel 32 in geared communication with the motor 42 and engaged with the chain 70. In some embodiments, Step S01 includes providing a guide wheel 33 that is position-adjustably engaged with the chain 70 to regulate a tension therein. In some embodiments, Step S01 includes providing first and second guide wheels $33_1$, 332 engaged with the chain 70 such that the chain 70 leaves the circumferential channel 67, partly circumscribes the first guide wheel $33_1$, partly circumscribes the drive wheel 32, partly circumscribes the second guide wheel 332, and returns to the circumferential channel 67. In some embodiments, the opposing catches 68 are disposed to substantially limit the maximum pivot range of the PV assembly 57 to an arc described by the circumferential channel 67.

Step S02 includes: providing electricity to rotate the motor 42, wherein the rotating of the motor 42 is effective to rotate the pivot wheel 50. In some embodiments, the motor 42 rotates the pivot wheel 50 with a final gear ratio of at least 10,000:1. In some embodiments, the final gear ratio is at least 12,000:1. In some embodiments, the maximum pivot range of the PV assembly 57 is through an arc subtending an angle of at least $\pi$ radians and less than $2\pi$ radians.

In some embodiments, the method additionally comprises method step S03, which is illustrated by the flow chart in FIG. 7B:

Step S03 includes: adjusting a position of a guide wheel 33 to regulate a tension in the chain 70.

Additional Discussion of Embodiments

Embodiments of the current invention relate to PV power conversion and generation and specifically to a single-axis PV tracker (SAT) directed to increasing PV power output in a PV array.

Figure 8:
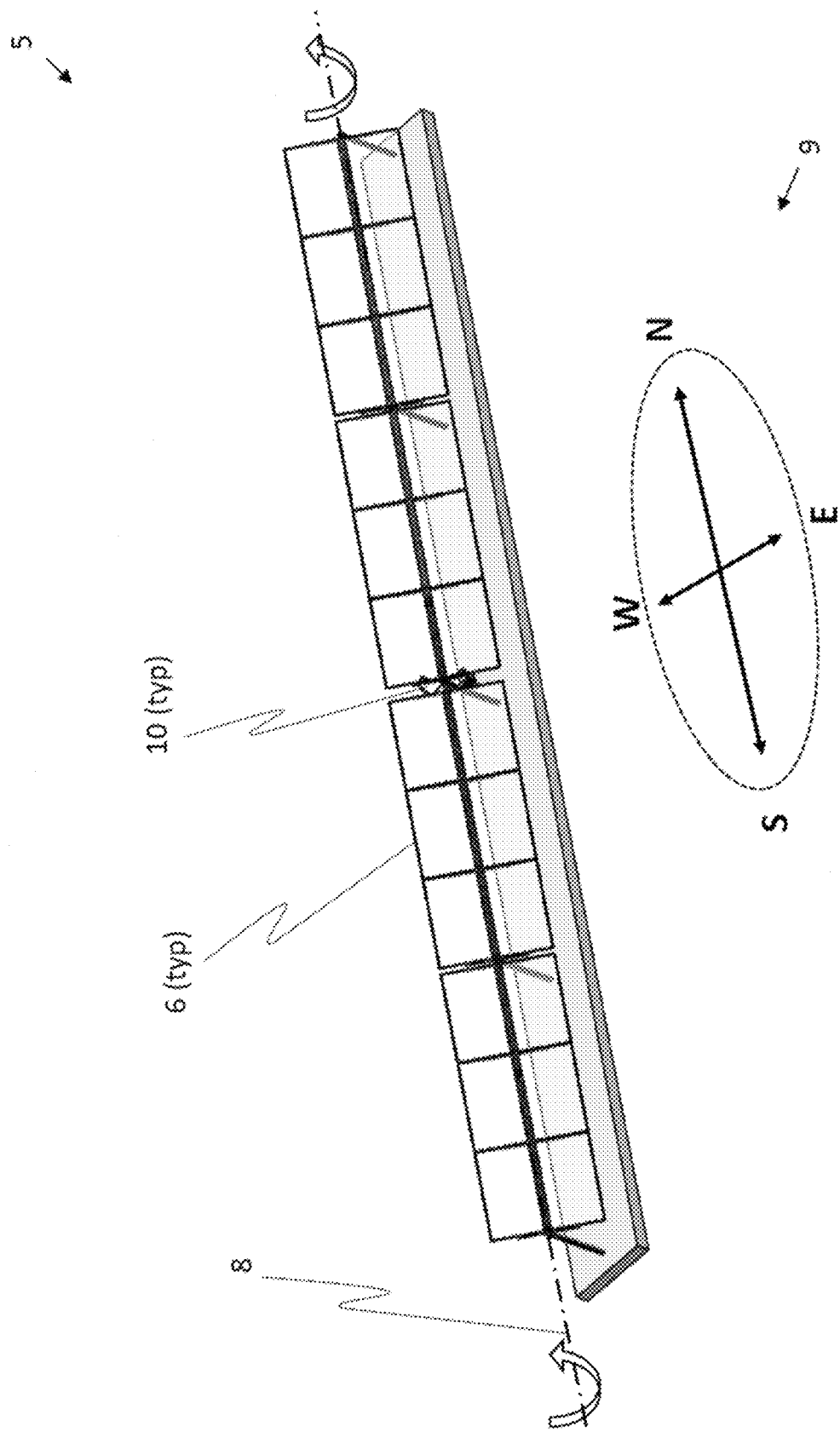
FIG. 8 is an isometric representation of a single-axis PV tracker directed to increasing PV power output in a PV array, in accordance with embodiments of the present invention.
Figure 9:
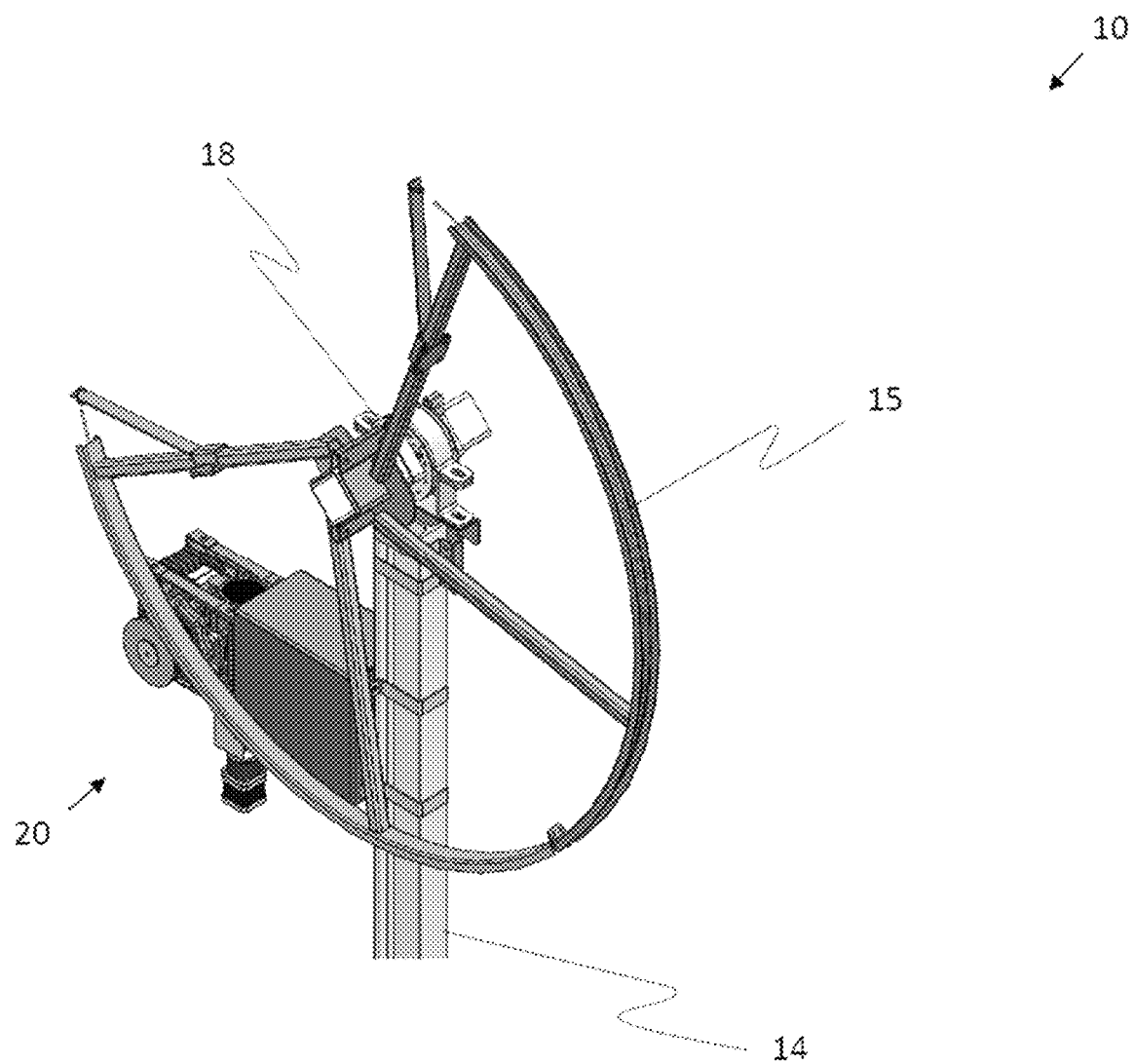
FIGS. 9 and 10 are detailed views of the drive-pylon unit of FIG. 8, in accordance with embodiments of the present invention.
Figure 10:
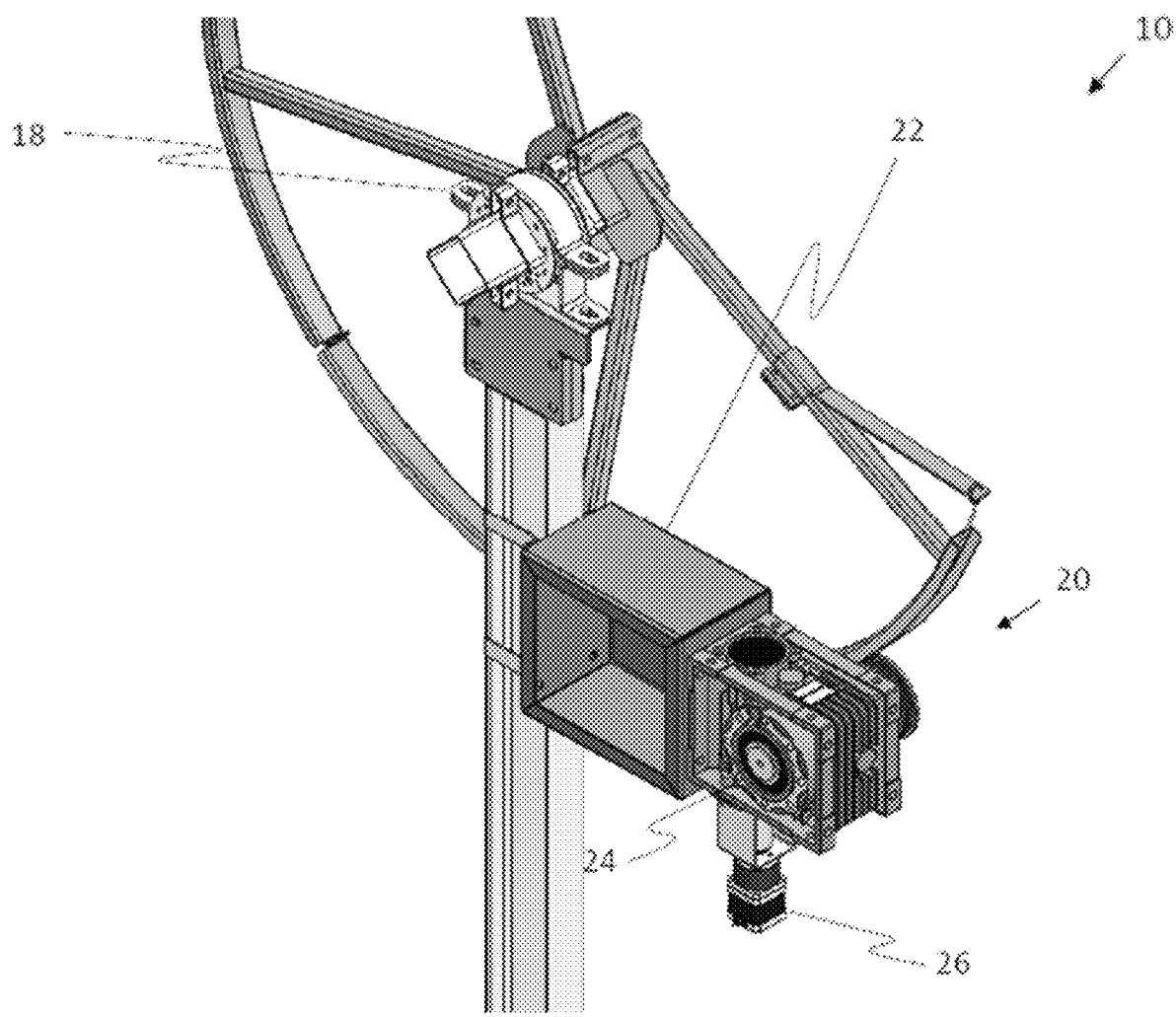

Reference is currently made to FIG. 8, which is an isometric representation of a SAT 5 directed to increasing PV power output in a PV array 6, in accordance with embodiments of the current invention. SAT 5 has an axis of rotation 8 oriented substantially in a north-south orientation, as indicated by compass indicator 9. The PV array is supported by at least one drive-pylon unit 10, which serves to both support and to rotate the PV array about the axis of rotation, as shown by the curved arrows, typically from East to West during a day.

The SAT is directed to capture more of the Direct Normal Irradiance (DNI) component of sunlight by orienting the solar panels more directly normal to the sun so that the Angle Of Incidence (AOI) between the solar radiation and a normal vector of the panel surface is minimized, minimizing a resultant cos(AOI) effect—a significant energy loss factor.

At the same time, the SAT serves to capture a diffuse component of the sun radiation. As noted hereinabove, the diffuse component captured and converted to electricity by single axis tracker is equivalent to Diffused Tilted Irradiance (DTI).

Figure 2B:
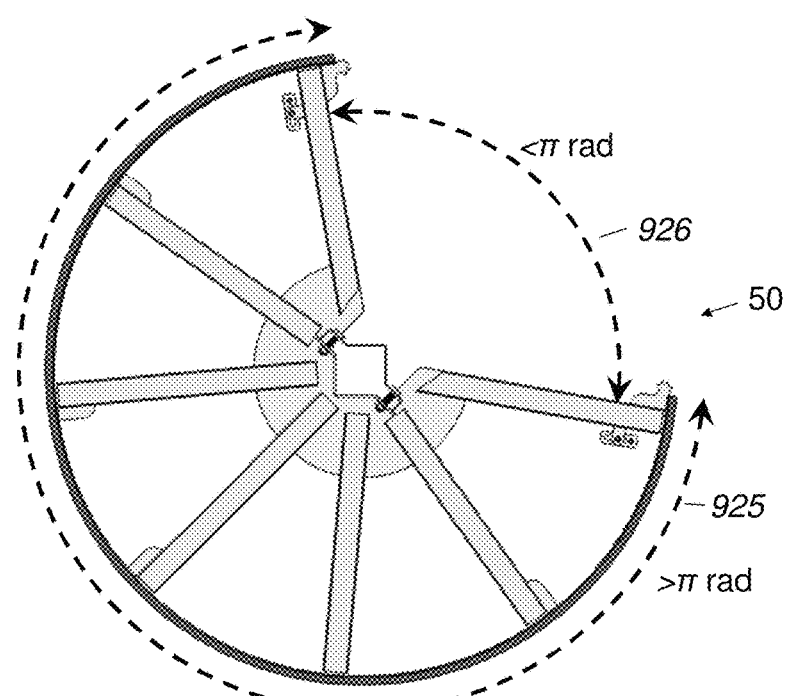
FIG. 2B illustrates the extent of the arc traversed by a pivot wheel according to embodiments of the present invention.

Reference is currently made to FIGS. 2 and 3, which are detailed views of drive-pylon unit 10, in accordance with embodiments of the current invention. Drive-pylon unit further includes a pylon 14, a panel support drive wheel 15, a torque tube support 18, and a control module 20. Control module 20 further includes a power pack 22, a motor and transmission 24, and a control unit 26.

The SAT has a typical length of 28 meters and includes 24 PV panels, all mounted 1.5 meters above the ground ("U Series"). However other SAT versions may have shorter lengths ("P Series") and/or lower or higher mounting distance ("A Series" high-mounted trackers, relevant for Agri-PV applications) above the ground.

Among the features of embodiments of the current invention are:

- 240-degree rotation of the PV panels so that they may face substantially downward at night. This orientation mitigates/prevents dirt and dew forming on the PV array surfaces.
- A nighttime downward orientation further allows straightforward cleaning of the panel from below—either manually or by a dedicated cleaning mechanism
- Automatic cleaning of one part and/or one panel of the PV array may be performed regularly (i.e., nightly, for example)—at a higher frequency than that of the entire SAT array. Because power output of each of the PV panels in the array is monitored regularly, the frequently-cleaned "control" panel serves as a datum against which to compare respective power outputs of the other panels in the array. In this way, an optimum cleaning frequency of all the panels can be determined.
- Rotation of the panels, employing 3 gears (or more) takes into account: need for high torque (strong rotation against winds); need for speed (tracking against momentary cloudiness); and need for energy savings/lifetime (nighttime rotation).

Exemplary PV panels having specifications compatible with embodiments of the single-axis PV tracker described herein include, and not exhaustively: Solar Panel Series LR5-72HBD, available from LONGi Solar Technology Co., Ltd., of Pudong Shanghai, China; 72HL4-BDVP series Tiger Pro solar panels available from Jinko Solar Co., Ltd., of Shanghai, China; and JAM72S30 series Deep Blue 3.0 solar panels available from JA Solar PV Technology Co., Ltd., of Beijing, China.

It will be appreciated that the above descriptions are intended only to serve as examples, and that many other embodiments are possible within the scope of the present invention and as defined in the appended claim.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

The invention claimed is:

1. A solar energy system comprising:
   a. A photovoltaic (PV) assembly comprising a support subassembly and an array of PV panels joined thereto and pivotable therewith about a longitudinal axis of the PV assembly; and
   b. a drive system comprising:
      i. a motor assembly comprising an electric motor and a gearing arrangement,
      ii. a pivot wheel comprising a hoop-portion and joined to the PV assembly, the hoop portion including an outer circumferential channel and two opposing catches circumferentially displaced from each other to define a maximum pivot range of the PV assembly, and
      iii. a chain residing partly within the circumferential channel and engaged with the two opposing catches, the chain in geared communication with the motor assembly such that the motor is operable to rotate the pivot wheel.

2. The solar energy system of claim 1, wherein (i) the motor assembly includes a drive wheel in geared communication with the motor and engaged with the chain, and (ii) the drive system additionally comprises a guide wheel position-adjustably engaged with the chain to regulate a tension therein.

3. The solar energy system of claim 2, wherein the drive system comprises first and second guide wheels engaged with the chain such that the chain leaves the circumferential channel, partly circumscribes the first guide wheel, partly circumscribes the drive wheel, partly circumscribes the second guide wheel, and returns to the circumferential channel.

4. The solar energy system of claim 1, wherein the motor is operable to rotate the pivot wheel with a final gear ratio of at least 10,000:1.

5. The solar energy system of claim 4, wherein the final gear ratio is at least 12,000:1.

6. The solar energy system of claim 1, wherein the two opposing catches are disposed to limit the maximum pivot range of the PV assembly to an arc described by the circumferential channel.

7. The solar energy system of claim 1, wherein the two opposing catches define a maximum pivot range of the PV assembly through an arc subtending an angle of at least $\pi$ radians and less than $2\pi$ radians.

8. A drive system for a solar energy system, the solar energy system including a PV assembly comprising a support subassembly and an array of PV panels joined thereto and pivotable therewith about a longitudinal axis of the PV assembly, the drive system comprising:
   a. a motor assembly comprising an electric motor and a gearing arrangement;
   b. a pivot wheel comprising a hoop-portion and joined to the PV assembly, the hoop portion including an outer circumferential channel and two opposing catches circumferentially displaced from each other to define a maximum pivot range of the PV assembly; and
   c. a chain residing partly within the circumferential channel and engaged with the two opposing catches, the chain in geared communication with the motor assembly such that the motor is operable to rotate the pivot wheel.

9. The drive system of claim 8, wherein (i) the motor assembly includes a drive wheel in geared communication with the motor and engaged with the chain, and (ii) the drive system additionally comprises a guide wheel position-adjustably engaged with the chain to regulate a tension therein.

10. The drive system of claim 8, wherein the motor is operable to rotate the pivot wheel with a final gear ratio of at least 10,000:1.

11. The drive system of claim 10, wherein the final gear ratio is at least 12,000:1.

12. The drive system of claim 8, wherein the two opposing catches define a maximum pivot range of the PV assembly through an arc subtending an angle of at least $\pi$ radians and less than $2\pi$ radians.

13. A method for rotating a PV assembly, the PV assembly comprising a support subassembly and an array of PV panels joined thereto and pivotable therewith about a longitudinal axis of the PV assembly, the method comprising:
  a. providing (i) a pivot wheel comprising a hoop-portion and joined to the PV assembly, the hoop portion including an outer circumferential channel and two opposing catches circumferentially displaced from each other, (ii) a drive system comprising a motor assembly comprising an electric motor and a gearing arrangement, and (iii) a chain residing partly within the circumferential channel and engaged with the two opposing catches, the chain in geared communication with the motor assembly;
  b. providing electricity to rotate the motor, wherein the rotating of the motor is effective to rotate the pivot wheel.

14. The method of claim 13, wherein providing the drive system includes (i) providing a drive wheel in geared communication with the motor and engaged with the chain, and (ii) providing a guide wheel position-adjustably engaged with the chain to regulate a tension therein.

15. The method of claim 14, additionally comprising: adjusting a position of the guide wheel to regulate a tension in the chain.

16. The method of claim 14, wherein providing the drive system includes providing first and second guide wheels engaged with the chain such that the chain leaves the circumferential channel, partly circumscribes the first guide wheel, partly circumscribes the drive wheel, partly circumscribes the second guide wheel, and returns to the circumferential channel.

17. The method of claim 13, wherein the motor rotates the pivot wheel with a final gear ratio of at least 10,000:1.

18. The method of claim 17, wherein the final gear ratio is at least 12,000:1.

19. The method of claim 13, wherein the two opposing catches define a maximum pivot range of the PV assembly through an arc subtending an angle of at least $\pi$ radians and less than $2\pi$ radians.

20. The method of claim 13, wherein providing the drive system is such that the opposing catches are disposed to substantially limit the maximum pivot range of the PV assembly to an arc described by the circumferential channel.

\* \* \* \* \*